United States Patent
Addepalli et al.

(10) Patent No.: US 9,258,234 B1
(45) Date of Patent: Feb. 9, 2016

(54) DYNAMICALLY ADJUSTING LIVELINESS DETECTION INTERVALS FOR PERIODIC NETWORK COMMUNICATIONS

(71) Applicant: Juniper Networks, Inc., Sunnyvale, CA (US)

(72) Inventors: Meher Aditya Kumar Addepalli, Sunnyvale, CA (US); Prashant Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 82 days.

(21) Appl. No.: 13/730,737

(22) Filed: Dec. 28, 2012

(51) Int. Cl.
*H04L 12/50* (2006.01)
*H04L 12/801* (2013.01)
*H04L 12/26* (2006.01)

(52) U.S. Cl.
CPC ............... *H04L 47/12* (2013.01); *H04L 43/06* (2013.01); *H04L 43/0864* (2013.01)

(58) Field of Classification Search
CPC ........................................... H04L 47/11–47/12
USPC .................................................. 370/229, 237
See application file for complete search history.

(56) References Cited

U.S. PATENT DOCUMENTS

| | | | |
|---|---|---|---|
| 5,253,248 A | 10/1993 | Dravida et al. |
| 5,848,128 A | 12/1998 | Frey |
| 6,173,411 B1 | 1/2001 | Hirst et al. |
| 6,304,546 B1 | 10/2001 | Natarajan et al. |
| 6,453,430 B1 | 9/2002 | Singh et al. |
| 6,507,869 B1 | 1/2003 | Franke et al. |
| 6,542,934 B1 | 4/2003 | Bader et al. |
| 6,618,360 B1 | 9/2003 | Scoville et al. |
| 6,751,188 B1 | 6/2004 | Medved et al. |
| 6,850,253 B1 | 2/2005 | Bazerman et al. |
| 6,910,148 B1 | 6/2005 | Ho et al. |
| 6,982,953 B1 | 1/2006 | Swales |

(Continued)

FOREIGN PATENT DOCUMENTS

| | | |
|---|---|---|
| EP | 1367750 A1 | 12/2003 |
| EP | 1861963 A2 | 12/2007 |

(Continued)

OTHER PUBLICATIONS

H3C S3610&S5510 Series Ethernet Switches (Version: 20081229-C-1.01, Release 5303, 2006-2008, Command Manual—BFD-GR).*

(Continued)

*Primary Examiner* — Yemane Mesfin
*Assistant Examiner* — Abdelillah Elmejjarmi
(74) *Attorney, Agent, or Firm* — Shumaker & Sieffert, P.A.

(57) ABSTRACT

In general, techniques are described to dynamically adjust a session detection time defined by a timer in accordance with a bidirectional forwarding detection (BFD) protocol. The techniques utilize existing hardware and BFD software infrastructure. An example network device includes a memory, programmable processor(s), and a control unit configured to execute a timer, receive one or more packets provided by the BFD protocol, detect, based on the received one or more packets, a congestion condition associated with a link via which the network device is coupled to a network, adjust, based on the detected congestion condition, a session detection time defined by the timer, and in response to a failure to receive a packet provided by the BFD protocol within the session detection time defined by the timer, detect a failure associated with the link.

15 Claims, 7 Drawing Sheets

(56) References Cited

U.S. PATENT DOCUMENTS

| | | |
|---|---|---|
| 7,055,063 B2 | 5/2006 | Leymann et al. |
| 7,120,693 B2 | 10/2006 | Chang et al. |
| 7,130,304 B1 | 10/2006 | Aggarwal |
| 7,139,263 B2 | 11/2006 | Miller et al. |
| 7,151,775 B1 | 12/2006 | Renwick et al. |
| 7,161,946 B1 | 1/2007 | Jha |
| 7,184,437 B1 | 2/2007 | Cole et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,359,377 B1 | 4/2008 | Kompella et al. |
| 7,362,700 B2 | 4/2008 | Frick et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,471,638 B2 | 12/2008 | Torrey et al. |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,561,527 B1* | 7/2009 | Katz .................... H04L 12/2697 370/241 |
| 7,609,637 B2 | 10/2009 | Doshi et al. |
| 7,639,624 B2 | 12/2009 | McGee et al. |
| 7,724,677 B2 | 5/2010 | Iwami |
| 7,738,367 B1 | 6/2010 | Aggarwal et al. |
| 7,765,306 B2 | 7/2010 | Filsfils et al. |
| 7,852,778 B1 | 12/2010 | Kompella |
| 7,860,981 B1 | 12/2010 | Vinokour et al. |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,254,271 B1 | 8/2012 | Nadeau et al. |
| 8,488,444 B2 | 7/2013 | Filsfils et al. |
| 8,503,293 B2 | 8/2013 | Raszuk |
| 2002/0093954 A1 | 7/2002 | Weil et al. |
| 2003/0112749 A1 | 6/2003 | Hassink et al. |
| 2005/0083936 A1 | 4/2005 | Ma |
| 2005/0195741 A1 | 9/2005 | Doshi et al. |
| 2005/0259634 A1 | 11/2005 | Ross |
| 2005/0281192 A1 | 12/2005 | Nadeau et al. |
| 2006/0018266 A1* | 1/2006 | Seo ....................... H04L 1/0002 370/252 |
| 2006/0095538 A1 | 5/2006 | Rehman et al. |
| 2006/0133300 A1 | 6/2006 | Lee et al. |
| 2006/0233107 A1 | 10/2006 | Croak et al. |
| 2006/0239201 A1 | 10/2006 | Metzger et al. |
| 2006/0262772 A1 | 11/2006 | Guichard et al. |
| 2006/0285500 A1 | 12/2006 | Booth et al. |
| 2007/0014231 A1 | 1/2007 | Sivakumar et al. |
| 2007/0041554 A1 | 2/2007 | Newman et al. |
| 2007/0061103 A1 | 3/2007 | Patzschke et al. |
| 2007/0165515 A1 | 7/2007 | Vasseur |
| 2007/0180104 A1 | 8/2007 | Filsfils et al. |
| 2007/0180105 A1 | 8/2007 | Filsfils et al. |
| 2007/0207591 A1 | 9/2007 | Rahman et al. |
| 2007/0220252 A1 | 9/2007 | Sinko |
| 2007/0263836 A1 | 11/2007 | Huang |
| 2007/0280102 A1 | 12/2007 | Vasseur et al. |
| 2008/0004782 A1 | 1/2008 | Kobayashi et al. |
| 2008/0049622 A1 | 2/2008 | Previdi et al. |
| 2008/0074997 A1 | 3/2008 | Bryant et al. |
| 2008/0225731 A1* | 9/2008 | Mori ....................... H04L 47/10 370/242 |
| 2008/0247324 A1 | 10/2008 | Nadeau et al. |
| 2008/0253295 A1 | 10/2008 | Yumoto et al. |
| 2009/0016213 A1 | 1/2009 | Lichtwald |
| 2009/0019141 A1 | 1/2009 | Bush et al. |
| 2009/0046579 A1 | 2/2009 | Lu et al. |
| 2009/0046723 A1 | 2/2009 | Rahman et al. |
| 2009/0225650 A1 | 9/2009 | Vasseur |
| 2009/0232029 A1 | 9/2009 | Abu-Hamdeh et al. |
| 2009/0279440 A1 | 11/2009 | Wong et al. |
| 2011/0063973 A1 | 3/2011 | VenkataRaman et al. |
| 2011/0170408 A1* | 7/2011 | Furbeck et al. ............. 370/230 |
| 2013/0028099 A1 | 1/2013 | Birajdar et al. |

FOREIGN PATENT DOCUMENTS

| | | |
|---|---|---|
| EP | 1864449 A2 | 12/2007 |
| EP | 1891526 A2 | 2/2008 |
| EP | 1891526 B1 | 2/2012 |

OTHER PUBLICATIONS

Kompella et al., "Detecting Multi-Protocol Label Switched (MPLS) Data Plane Failures," Network Working Group, RFC 4379, Cisco Systems, Inc., Feb. 2006, 50 pp.

Katz et al., "Bidirectional Forwarding Detection (BFD)," Internet Engineering Task Force (IETF), RFC 5880, Juniper Networks, Jun. 2010, 49 pp.

Katz et al., "Bidirectional Forwarding Detection (BFD) for IPv4 and IPv6 (Single Hop)," Internet Engineering Task Force (IETF), RFC 5881, Juniper Networks, Jun. 2010, 7 pp.

Katz et al., "Generic Application of Bidirectional Forwarding Detection (BFD)," Internet Engineering Task Force (IETF), RFC 5882, Juniper Networks, Jun. 2010, 15 pp.

Katz et al., "Biderectional Forwarding Detection (BFD) for Multihop Paths," Internet Engineering Task Force (IETF), RFC 5883, Juniper Networks, Jun. 2010, 6 pp.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.

Kolon, "BFD spots router forwarding failures," Network World, www.networkworld.com/news/tech/2005/030705techupdate.html, Mar. 7, 2005, 3 pp.

Aggarwl, "OAM Mechanisms in MPLS Layer 2 Transport Networks," IEEE Communications Magazine, Oct. 2004, pp. 124-130.

Atlas, "ICMP Extensions for Unnumbered Interfaces," draft-atlas-icmp-unnumbered -00, Dec. 9, 2005, 8 pp.

Atlas, ICMP Extensions for Unnumbered Interfaces, draft-atlas-icmp-unnumbered-01, Feb. 2006m 8 pp.

Bonica et al., "Generic Tunnel Tracing Protocol (GTTP) Specification," draft-bonica-tunproto-01.txt, IETF Standard-Working-Draft, Internet Engineering Task Force, Jul. 2001, 20 pp.

Berkowitz, "Router Renumbering Guide," Network Working Group, RFC 2072, Jan. 1997, 41 pp.

Mannie, "Generalized Multi-Protocol Label Switching Architecture," Network Working Group, Internet draft, draft-ietf-ccamp-gmpls-architecture-07.txt, May 2003, 56 pp.

Kompella et al., Signalling Unnumbered Links in Resource ReSerVation Protocol—Traffic Engineering (RSVP-TE), Network Working Group, RFC 3477, Jan. 2003, 8 pp.

Sun Hai-feng, "Advanced TCP Port Scan and it's Response," O.L. Automation 2005, vol. 24, No. 4, China Academic Electronic Publishing House, http://www.cnki.net, Apr. 24, 2005, 2 pp. (Abstract only).

"Using the IP unnumbered configuration FAQ," APNIC, www.apnic.net/info/faq/ip_unnumb.html, Jul. 1, 2005, 2 pp.

"Configure the loopback Interface," www.juniper.net/techpubs/software/junos/junos56/index.html, Last printed Nov. 7, 2005, 2 pp.

Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.

"ICMP (Internet Control Message Protocol)," Data Network Resource, www.rhyshaden.com/icmp.html, last printed Nov. 10, 2005, 4 pp.

"Traceroute," Webopedia, www.webopedia.com/TERM/t/traceroute.heml, Aug. 26, 2004, 1 p.

"RFC 2151—(rfc2151)—A primer on Internet and TCP/IP Tools and Utilities," www.rfcsearch.org/rfcview/RFC/2151.html, last printed Nov. 9, 2005, 3 pp.

(56) References Cited

OTHER PUBLICATIONS

Gorry Fairhurst, "Internet Control Message protocol," Internet Control Protocol, (ICMP), www.erg.abdn.ac.uk/users/gorry/course/inet-pages/icmp.html, last printed Sep. 6, 2006, 3 pp.

"ActiveXperts Ping backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pp.

Vijay Mukhi et al., "Internet Control Message Protocol ICMP," www.vijaymukhi.com/vmis/icmp, last printed Sep. 6, 2006, 5pp.

"Configure an Unnumbered Interface," www.juniper.net/techpubs/software/junos/junos56/index.html, last printed Nov. 7, 2005, 1 p.

Chen et al., "Dynamic Capability for BGP—4," Network Working Group, Internet Draft, draft-ietf-idr-dynamic-cap-03.txt, Dec. 2002, 6 pp.

Sangli et al., "Graceful Restart Mechanism for BGP," Network Working Group, Internet Draft, draft-ietf-idr-restart-06.txt, http://toolsietf.ort/html/draft-ietf-idr-restart-06, Jan. 2003, 10 pp.

Katz et al., BFD for Multipoint Networks, Network Working Group, Internet Draft, draft-ietf-bfd-multipoint-00.txt, Oct. 2011, 29 pp.

Saxena et al., Detecting Data-Plane Failures in Point-to-Multipoint Mpls—Extensions to LSP Ping, Internet Engineering Task Force (IETF) RFC 6425, Nov. 2011, 28 pp.

Hedge et al., Multipoint BFD for MPLS, Network Working Group, Internet-Draft, draft-chandra-hedge-mpoint-bfd-for-mpls-00.txt, Mar. 2012, 12 pp.

\* cited by examiner

DYNAMICALLY ADJUSTING LIVELINESS DETECTION INTERVALS FOR PERIODIC NETWORK COMMUNICATIONS

TECHNICAL FIELD

This disclosure relates generally to computer networks, and more specifically, to periodic communications, such as communications for liveliness detection, between devices in a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes available routes through the network. Each route defines a path between two locations on the network. Upon receiving an incoming packet, the router examines information within the packet and forwards the packet in accordance with the muting information. In order to maintain an accurate representation of a network, routers maintain control-plane peering sessions through which they exchange routing or link state information that reflects the current topology of the network.

Routers typically send periodic packets to each other via the peering sessions to confirm connectivity and to indicate operational status of each device. These periodic packets are sometimes referred to as "keepalives" or "hellos." The routers may use the periodic packets for network liveliness detection, i.e., to detect connectivity status with each other. For example, a router may send periodic packets to a peer router every 50 milliseconds (ms) to indicate that the router is still operational. Likewise, the router may detect reception of corresponding periodic packets from the peer router within the same period of time (e.g., 50 ms). When a packet is not received in the allotted time frame, the router determines that a network event has occurred, such as failure of the peer router or failure of a link or node connecting the two routers. Consequently, the router may update various routing information to redirect network traffic and may issue a number of routing protocol update messages to neighboring routers indicating a topology change.

As one example, routers may exchange periodic packets by establishing a session provided by the bidirectional forwarding detection (BFD) protocol. In accordance with BFD, a first router periodically sends BFD packets at a negotiated transmission time interval and detects a connectivity failure when the router does not receive a BFD packet from a second router within session detection time interval. The transmission time interval for BFD may be negotiated by the routers. The BFD session detection time interval is not negotiated. Instead, each receiving router independently calculates BFD session detection interval based on the negotiated transmit interval and a detection multiplier statically configured for that router. For instance, a router may negotiate to receive BFD packets every 50 ms from a peer router and may independently utilize a detection multiplier of three (3) times that interval, i.e., 150 ms in this example, for detecting failure. If the receiving router does not, receive a. BFD packet from the peer router within the 150 ms session detection time interval, the receiving router detects a connectivity failure with respect to the second router. Consequently, the receiving router may update its routing information to route traffic around the second router. Further details of the BFD protocol may be found in the proposed standard for RFD, by D. Katz and D. Ward (Juniper Networks, June 2010, ISSN: 2070-1721), the entire content of which is incorporated herein by reference.

SUMMARY

In general, techniques of this disclosure are directed to dynamically adjusting an expected interval for periodic communications used by devices for detecting connectivity failure. For example, the techniques may be used to dynamically adjust a session detection time interval for a bidirectional forwarding detection (BFD) session, based on one or more network characteristics detected by a router. In accordance with one or more aspects of this disclosure, a router is configured to dynamically adjust the BFD adjacency timer in response to current network congestion conditions detected by the router. In various implementations, the router may detect network congestion using one or more attribute(s) specified within BFD packets received from the peer router and/or timing measurement(s) associated with the received BFD packets. For instance, the router may detect whether or not network congestion exists over the link by discerning one or more values specified within a received BFD packet.

In other examples, the router may be configured to detect network congestion by measuring and extrapolating various timing statistics associated with the BFD packets received from the peer router. Examples of such timing measurements include delay between receipt of BFD packets, and the rate of change of the delay (or "jitter"). Based on detecting congestion (or a level of congestion), the router may set the BFD timer to different time intervals.

In one example, a method includes receiving, by a network device, one or more packets provided by a bidirectional forwarding detection (BFD) protocol, and detecting, by the network device and based on the received one or more packets, a congestion condition associated with a link via which the network device is coupled to a network. The method further includes adjusting, by the network device and based on the detected congestion condition, a session detection time defined by a timer executing on the network device, and in response to a failure to receive a BFD packet within the session detection time defined by the timer, detecting, by the network device, a failure of the link.

In another example, a network device includes a memory, programmable processor(s), and a control unit configured to execute a timer, receive one or more packets provided by a BFD protocol, detect, based on the received one or more packets, a congestion condition associated with a link via which the network device is coupled to a network, adjust, based on the detected congestion condition, a session detection time defined by the timer, and in response to a failure to receive a BFD packet within the session detection time defined by the timer, detect a failure of the link.

In another example, a computer-readable storage medium is encoded with instructions. The instructions cause one or more programmable processors of a network device to receive one or more packets provided by a BFD protocol, detect, based on the received one or more packets, a congestion condition associated with a link via which the network device is coupled to a network, adjust, based on the detected congestion condition, a session detection time defined by a timer executing on the network device, and in response to a failure to receive a BFD packet within the session detection time defined by the timer, detect a failure of the link.

Maintaining a static BFD detection timer (with a constant multiplier value to derive the session detection time) throughout a BFD session introduces several potential issues. As examples, the inflexibility of a static BFD detection timer may cause a router to either trigger false alarms in terms of link failure, or to detect a link failure after a time delay. More specifically, false alarms occur in cases where the router detects a link failure due to a congestion-based delay of an arriving BFD packet. The false alarm scenario is an example of the BFD detection tinier being set too low (or too aggressively) for current network conditions. Conversely, in cases of low-to-no network congestion over the link, strict adherence to the static BFD detection timer may cause a router to detect a link failure some time after the failure actually occurred, potentially causing packet loss over the link during the detection delay. The detection delay scenario is an example of the BFD detection timer being set too high for current network conditions.

The techniques of this disclosure provide several potential advantages. A router implementing the techniques dynamically adjusts the BFD detection timer during a BFD session based on current network conditions. In cases of network congestion over the link, the router increases the BFD detection timer, thereby allowing for congestion-based delays in receiving BFD packets before identifying a link failure and terminating the BFD session. By avoiding terminating the BFD session due to false alarms, the router may conserve computing time and resources that it would otherwise expend in updating its routing information base (RIB) and corresponding forwarding information base (FIB). Also, by avoiding terminating the BFD session due to false alarms, the router may reduce or eliminate possible traffic drops.

Conversely, in cases of low or no network congestion over the link, the router is configured to reduce the time interval specified by the BFD detection timer, thereby creating a more aggressive expectation of incoming BFD packets. In such scenarios, the router may more quickly detect legitimate link failures, and update its RIB and FIB accordingly. By detecting the link failure and implementing these remediation measures at an early stage, the router may mitigate or even eliminate packet loss caused by the link failure. Additionally, routers can implement the improved BFD-based techniques of this disclosure without any changes to existing hardware or software infrastructure, and without generating any new types of network traffic for the sole purpose of detecting link, failures. Instead, such routers may utilize the mechanisms and packet structure currently provided by the RFD protocol to implement the enhancements described herein.

The details of one or more examples are set forth in the accompanying drawings and the description below. Other features, objects, and advantages of this disclosure will be apparent from the description and drawings, and from the claims.

DETAILED DESCRIPTION

Figure 1:
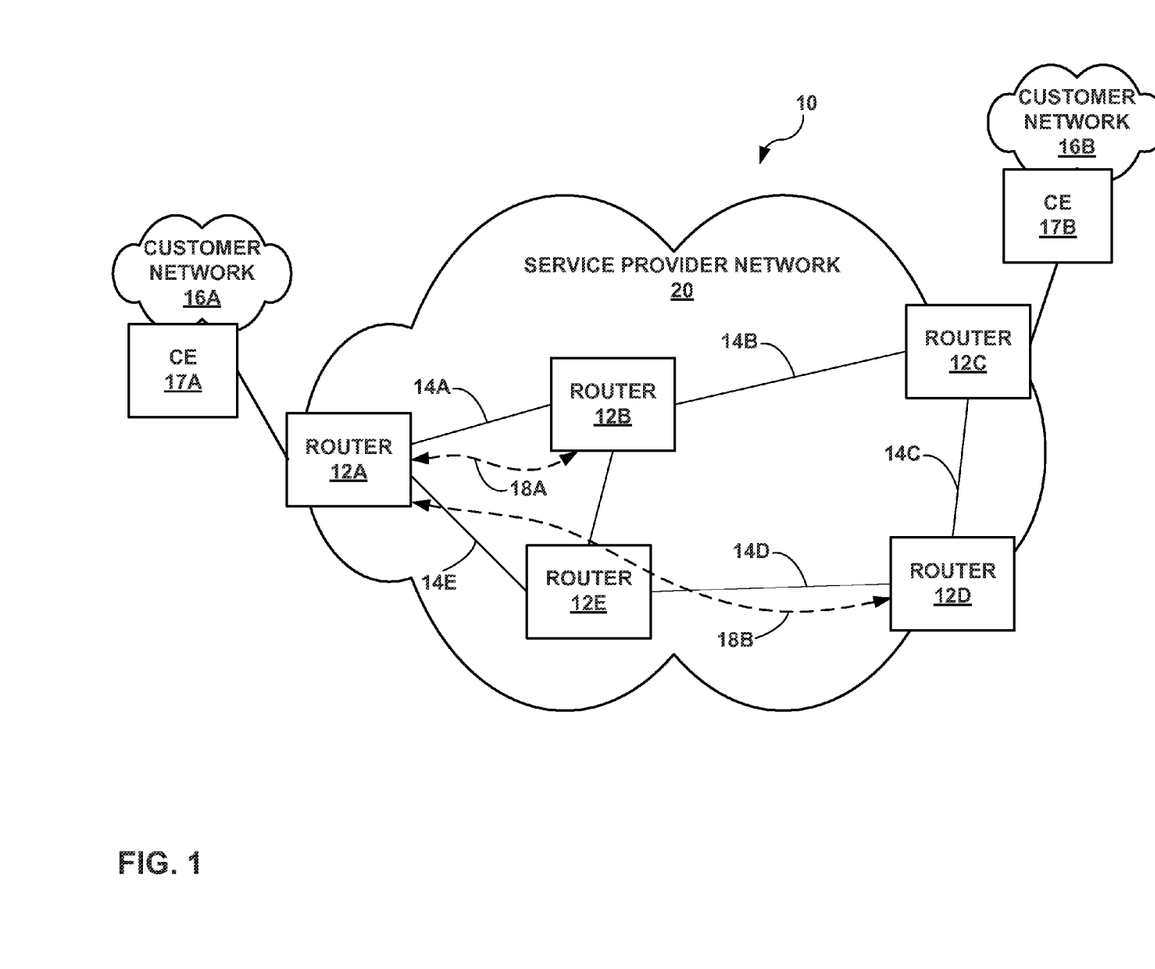
FIG. 1 is a block diagram illustrating an example network system in which techniques described herein may be implemented.

FIG. 1 is a block diagram illustrating example network system 10 in which techniques described herein may be implemented. Network system 10 includes service provider network 20, which is communicatively coupled to customer networks 16A and 16B ("customer networks 16"). In turn, service provider network 20 includes routers 12A-12E ("routers 12"), which operate and interact with one another in accordance with the techniques described herein. Routers 12 are communicatively coupled to one another, either directly, or indirectly, via physical links 14A-14E ("links 14"). Links 14 represent any physical medium, such as a copper wire, a coaxial cable, any of a host of different fiber optic lines, a wireless connection, and various combinations thereof. In the specific example of FIG. 1, routers 12A and 12C represent edge routers. More specifically, routers 12A and 12C provide an interface between service provider network 20 and respective customer networks 16.

Additionally, customer networks 16 include respective customer edge routers 17A and 17B ("CE routers 17"). As shown, each of CE routers 17 is linked to a respective edge router of routers 12. Edge routers 12A and 12C communicate with CE routers 17 to provide customer networks 16 with access to service provider network 20. As shown, each of customer networks 16 may be a network for a site of an enterprise. Each of customer networks 16 may include one or more computing devices (not shown), such as personal computers, laptop computers, handheld computers, workstations, servers, switches, printers, or other devices. Service provider network 20 may be coupled to one or more networks administered by other service providers, and may thus form part of a large-scale public network infrastructure, e.g., the Internet. Consequently, customer networks 16 may be viewed as edge networks of the Internet.

The service provider may provide computing devices within customer networks 16 with access to the Internet via service provider network 20, which allows computing devices within one of customer networks 16 to communicate with computing, devices within the Internet, or the other one of customer networks 16. FIG. 1 may be a simplified view of network system 10. For instance, service provider network 20 can include a variety of other network devices not shown), such as routers, switches, servers, and the like and may be connected to other networks. In contrast to edge routers 12A and 12C, the remainder of routers 12 represent intermediate routers. More specifically, intermediate routers 12B, 12D, and 12E provide various communication channels between edge routers 12A and 12C.

Routers 12 communicate in accordance with one or more control-plane protocols to maintain accurate representation of the topology of service provider network 20. For example, routers 12 maintain peering sessions with each other and exchange routing information for routes or links within service provider network 20 in accordance with a routing protocol. Example protocols include the Border Gateway Protocol (BGP) distance vector routing protocol and the Open Shortest Path First (OSPF) and intermediate System-to-Intermediate System (IS-IS) link state routing protocols.

In addition to exchanging session messages to convey network topology information, routers 12 periodically send status inquiries (e.g., send "periodic packets" or "periodic data") to one another in order to monitor the state of the other devices. That is, by sending periodic inquiries and detecting receipt of similar periodic inquiries, routers 12 detect any failures in communicating data between each other, either as a result of failure of one or more of routers 12 or of links 14 between them. Upon detecting such a failure, the detecting router 12 updates one or more internal representations of the topology of service provider network 20, and outputs session messages to the other routers 12 to inform the other routers 12 of the topology changes.

Typically, the length of time between which routers 12 transmit the periodic data or messages to one another correlates directly to the speed at which routers 12 detect any failure in communications between one another and thus update the respective representation of the topology of service provider network 20 to respond to the failure. For this reason, routers 12 are frequently configured to seek receipt of consecutive periodic inquiries within a relatively short length of time, e.g., within a few seconds or even in the order of milliseconds (ms).

One exemplary protocol, referred to as the bidirectional forwarding detection (RFD) protocol, is commonly used between two routing devices in order for each router to closely monitor the state (e.g., health) of the other routing, device. For example, two of routers 12 that exchange routing information via the OSPF or ISIS muting protocols establish a BFD session for sending and responding to status inquiries in the form of Hello packets or Echo packets, either asynchronously or when needed (e.g., as in the BFD Demand Mode). In either case, the BFD protocol provides a very short interval of time between which routers 12 must transmit periodic messages, and thus may facilitate the quicker detection of failures by routers 12 that are in an active BFD session.

Although described herein with reference to the BFD protocol, the techniques may apply to any protocol allowing for periodic messages for inquiring as to the status of a peering device. Further, the techniques may be applicable to routers 12 that use these periodic communications for media access control (MAC) layer protocols, such as the frame relay LMI, point-to-point (PPP) protocol. Moreover, the techniques further include instances where routers 12 employ the BFD protocol in conjunction with any of the above protocols, as well as, protocols not contemplated herein. In these instances, routers 12 may employ the BFD protocol for detecting failures and the other protocol for other routing functions, such as route resolution.

In the example of FIG. 1, various pairs of routers 12 exchange periodic messages in accordance with the BFD protocol. The BFD protocol enables each of routers 12 to negotiate an interval for each BFD session. In other words, router 12A may negotiate a BFD session 18A with router 12B, and network devices 12A, 12B may establish a 10 ms interval for BFD session 18A. Meanwhile, router 12A may negotiate a second BFD session 18B with router 12D. In this example, routers 12A and 12D may establish a response interval of 100 ms for BFD session 18B. As illustrated through the example of router 12A, a single router may participate in multiple BFD sessions, even if the BFD sessions have different attributes. Each of routers 12A, 12B, and 12D execute one or more BFD timers. For example, each of routers 12A, 12B, and 12D) executes a transmission timer and a detection (or "adjacency") timer. Each transmission timers measures intervals for the respective router 12 to transmit a BFD packet over a particular session, and triggers transmission of a BFD packet upon reaching the negotiated interval.

The detection (or adjacency) timer measures intervals between received BFD packets over a BFD session. Using the adjacency timer, routers 12 determine the status of a connection corresponding to a BFD session. For instance, routers 12 often use the adjacency timer to determine a session detection time. If a particular router 12 does not receive a BFD packet within the session detection time, the particular router 12 detects a network event, such as a failure of the link associated with the BFD session. In many instances, routers 12 set the timer to a multiple (e.g., an integer multiple) of the negotiated interval for received BFD packets, such as a value of (3*Interval) ms. In examples, the negotiated interval for receiving BFD packets corresponds to the negotiated transmit interval of the peer router in the BFD session.

In the examples described above, the different intervals negotiated with respect to BFD sessions 18A and 18B reflect the nature of the connections between the respective sets of routers in each of between BFD sessions 18A and 18B. For instance, BFD session 18A corresponds to a direct connection (over link 14A) between routers 12A and 12B. In other words, BFD packets sent over BFD session 18A are not routed through an intermediate router. In contrast, BFD session 18B represents a so-called "multi-hop" BFD session. More specifically, BFD session 18B is established between routers 12A and 12D, which are not directly coupled by a physical link. Instead, routers 12A and 12D communicate through intermediate router 12E.

As a result, the respective pairs of routers 12 that establish BFD sessions 18A and 18B negotiate transmit and/or receipt intervals that are suited to each router's capabilities, and to the nature of the link between them. In turn, router 12A may set a session detection time based on the receipt interval to determine a failure associated with router 12B using BFD session 18A.

Each of routers 12 may also negotiate a device-specific transmit interval. In other words, the transmit interval can vary for each router 12 of BFD session 18B. For instance, during BFD session 18B, router 12D may transmit a BFD packet every 10 ms, while router 12A may transmit a BFD packet every 15 ms. In turn, router 12A may implement a BFD adjacency timer with a receipt interval of 10 ms, and router 12D may implement a BFD adjacency timer with a receipt interval of 15 ms. This notion of device-specific intervals explains the "bidirectional" or "B" of the "BFD" protocol, as the periodic messages can be controlled differently in each direction.

Data traffic over service provider network 20 may vary at different times. As one example, devices of customer networks 16 may transmit and elicit high volumes of data over service provider network 20 during business hours of a weekday. Conversely, customer networks 16 may cause substantially lighter traffic over service provider network 20 during non-business hours. This variation in traffic frequently affects BFD sessions 18A and 18B. More specifically, heavier traffic potentially delays the transport of BFD packets over links 14, while lighter traffic enables unencumbered transport of the BFD packets. The condition of transport delays due to heavy data traffic is referred to herein as "congestion."

Varying congestion conditions introduce several issues and potential inaccuracies it the BFD session participation of routers 12. As described, greater congestion can cause a network device in a BFD session, such as router 12A, to receive a BFD packet after a congestion-based delay. However, due to strict adherence to the session detection time defined by the respective adjacency timer, router 12A may erroneously detect a failure of an active BFD session, such as BFD session 18A. Based on the erroneously-detected failure, router 12A is configured to update its current representation of the topology of service provider network 20, as well as the packet forwarding schemes, to account for link 14A and/or router 12B being down. Additionally, router 12A is configured to disseminate the updated topology to the remaining routers 12, causing the remaining routers 12 to also update their respective routing and forwarding data. When caused by false alarms due to network congestion conditions, such erroneous failure detection and resulting remediation measures may cause substantial churn and resource waste over service provider network 20, thereby compromising data transport to and from customer networks 16.

Conversely, during periods of light or no congestion, router 12A can afford to implement a more aggressive session detection time to detect BFD failures. For instance, using a greater session detection time over RFD session 18B may cause router 12A to detect a failure of router 12D and/or one or both of links 14D and 14E some time after a legitimate failure. During the delay period, router 12A may continue to route traffic through links 14D and 14E, or otherwise through router 12D, causing packet loss. The examples above illustrate potential disadvantages of maintaining a static session detection time regardless of congestion conditions over service provider network 20.

To mitigate or eliminate these potential disadvantages, a router in a BFD session, such as router 12A, implements the techniques of this disclosure to dynamically adjust the session detection time defined by respective adjacency timer based on current congestion conditions over service provider network 20. More specifically, in accordance with the techniques, router 12A is configured to increase the session detection time defined by the adjacency timer during certain greater congestion conditions, and to reduce the session detection time during lesser congestion conditions. In addition, router 12A is configured to detect the congestion conditions using BFD packets received over BFD sessions 18A and 18B, thereby eliminating the need for additional congestion-detection infrastructure.

In some implementations, router 12A is configured to detect a congestion condition using one or more attributes specified within received BFD packets. For instance, router 12A may use data specified in an explicit congestion notification (ECN) field of control data (e.g., the IP header) of the received RFD packet to determine the congestion condition over the network. More specifically, any transit router of the BFD session experiencing congestion may set an explicit congestion notification (ECN) field in the IP header of the BFD packet to indicate the detected congestion condition. In turn, router 12A may check the ECN field in the IP header of a received BFD packet, and toggle the value of the failure threshold between a high multiple of the BFD interval (e.g., 5*10 ms=50 ms) and a low multiple (e.g., 2*10 ms=20 ms) based on whether the ECN field indicates congestion or not. This implementation is an example of a binary adjustment of the BFD detection timer, i.e., a switch between two possible values based on a presence or absence of congestion. In other implementations, router 12A may toggle the value of the failure threshold between a high and low multiple of the BFD interval based on an ECN field, of any received, IP packet header, wherein the source and destination addresses of the received IP packet match the IP addresses of the BFD session endpoints.

In other implementations, router 12A is configured to discern a congestion value associated with a BFD session. For instance, router 12B may use one or both of control-plane (header) or data-plane (payload) information of a received BFD packet to indicate a congestion level over BFD session 18A. More specifically, router 12B communicates the congestion level as a value (e.g., high-medium-low, or as a numeric value) using data specified within a BFD packet transmitted over BFD session 18A. In turn, router 12A is configured to adjust the session detection time defined by the adjacency timer based on the congestion level indicated in the BFD packets received over BFD session 18A. In this example, router 12A may choose from three or more available session detection times, or may generate three or more possible session detection times based on the received congestion information. Such implementations are examples of a granular adjustment of the session detection time, i.e., a more congestion-sensitive approach to adjusting the session detection time specified by the adjacency timer.

The implementations described above are examples in which router 12A is configured to detect congestion based on content of (e.g., attributes specified within) BFD packets received over a RFD session. In these and other examples, router 12A may implement the techniques of this disclosure to detect congestion based on timing measurements associated with BFD packets received over a particular BFD session. As one example, router 12A uses the delay between receipt of consecutive BID packets received over BFD session 18B to detect congestion over BFD session 18B. In this example, router 12A is configured to determine a detection multiplier (e.g., a numeric value) based on the detected congestion, and apply the detection multiplier to the receipt interval to set a new congestion-adjusted session detection time.

More specifically, router 12A detects the delay, which is referred to herein as a first order statistic, between receipt of consecutive BFD packets over BFD session 18B. In a scenario that is free of congestion-based delays, router 12A will receive consecutive BFD packets at time intervals matching the negotiated receipt interval. However, in a congestion-delayed scenario, router 12A receives consecutive BFD packets at time intervals exceeding the negotiated receipt interval. In cases of congestion-based delays, router 12A is configured to calculate an average of receipt delays associated with a series of consecutive pairs of BFD packets. An example of an average function that router 12A calculates is a normalized weighted moving average of the delays along the series. Based on the calculated average, router 12A determines a new detection multiplier value by which to set the adjusted session detection time. More specifically, router 12A applies the new detection multiplier to the negotiated receipt interval to derive the adjusted session detection time during the life of BFD session 18B. In this manner, router 12A is configured to dynamically adjust the session detection time during a BFD session based on detected congestion conditions. In examples, router 12A sets an upper bound for the detection multiplier, so as to avoid setting the session detection time to an excessively high value, even in cases of severe congestion over BFD Session 18B. In these examples, router 12A may determine the weighted moving average of delays to automatically account for any lost packets due to congestion, thereby implementing the algorithm in a robust manner.

Router 12A may also determine the new detection multiplier value based on a second-order timing statistic, known as jitter. Jitter represents the rate of change of delay over a series of received BFD packets. For instance, router 12A is configured to determine how the delay changes between pairs of consecutive packets along the series. Similar to the delay-based operation described above, router 12A is configured to apply the new detection multiplier during the life of BFD session 18B, thereby dynamically adjusting the session detection time based on congestion conditions.

Figure 2:
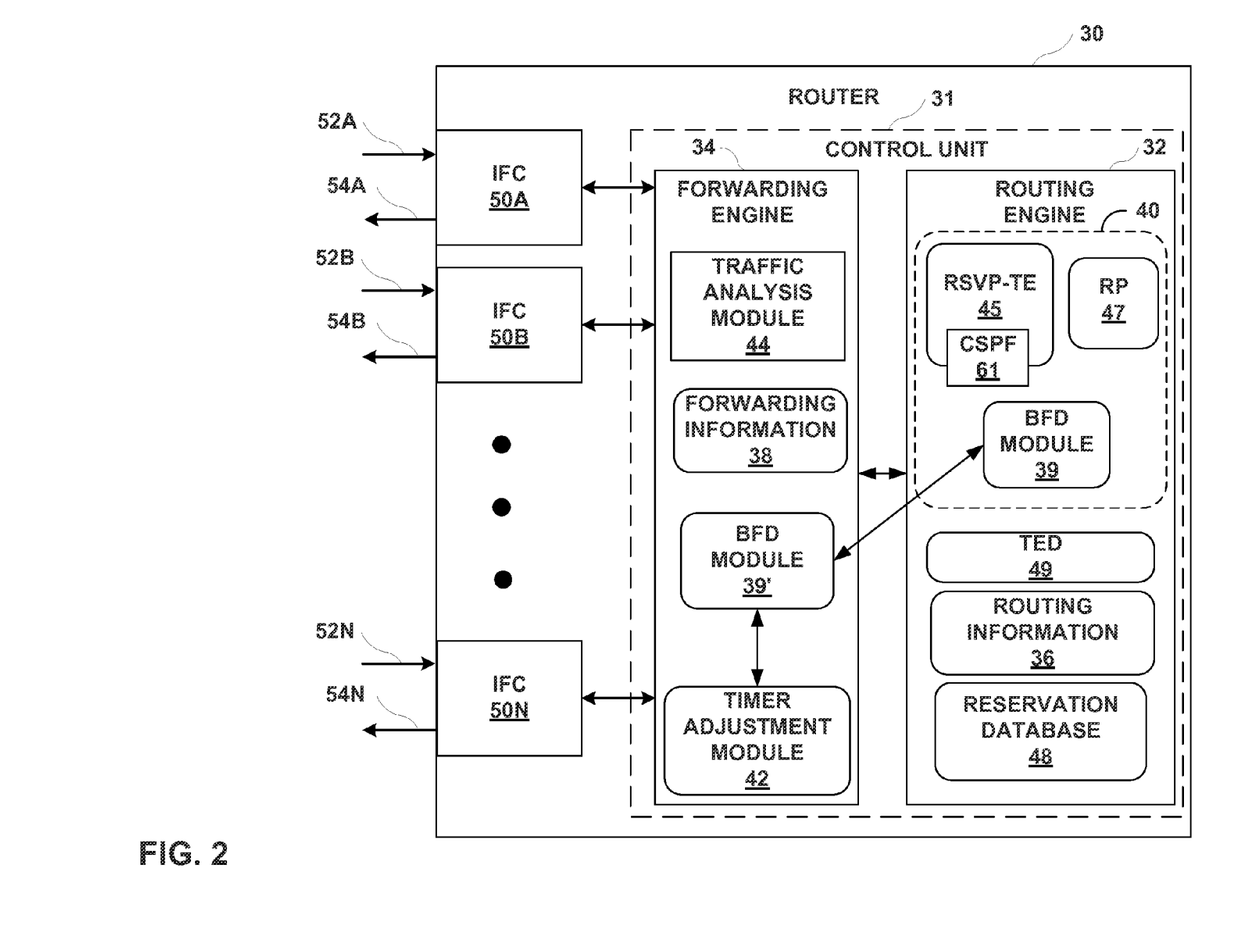
FIG. 2 is a block diagram illustrating an exemplary router in accordance with the disclosure herein.

FIG. 2 is a block diagram illustrating exemplary router 30 in accordance with the disclosure herein. Router 30 is one example implementation of any of routers 12 illustrated in FIG. 1. While router 30 illustrates one possible muter implementation to perform the techniques described herein, it will be appreciated that various other implementations are possible in accordance with this disclosure.

In this example, router 30 includes a control unit 31 that comprises a routing engine 32 and a forwarding engine 34. In addition, router 30 includes a set of interface cards (IFCs) 50A-50N (collectively, "IFCs 50") for communicating packets via inbound links 52A 52N (collectively, "inbound links 52") and outbound links 54A-54N (collectively, "outbound links 54").

Routing engine 32 primarily provides an operating environment for control plane protocols, such as those included in protocols 40. For example, one or more routing protocols ("RP") 47 maintain routing information 36 to reflect the current topology of a network and other network entities to which it is connected. In particular, RP 47 updates routing information 36 to accurately reflect the topology of the network and other entities. Example routing protocols include Multi-Protocol Border Gateway Protocol (mBGP), the Intermediate System to Intermediate System (ISIS) routing protocol, the Open Shortest Path First (OSPF) routing protocol and the like.

Routing engine 32 generates and programs forwarding engine 34 with forwarding information 38 that associates network destinations with specific next hops and corresponding interface ports of IFCs 50 in accordance with routing information 36. Routing engine 12 may generate forwarding information 38 in the form of a radix tree having leaf nodes that represent destinations within the network.

Based on forwarding information 38, forwarding engine 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution, the contents of which is incorporated herein by reference in its entirety.

In one example, forwarding engine 34 is a rich and dynamic shared forwarding plane, optionally distributed over a multi-chassis router. Moreover, forwarding plane 34 may be provided by dedicated forwarding integrated circuits normally associated with high-end routing components of a network router. Further details of one example embodiment of router 30 can be found in U.S. Provisional Patent Application 61/054,692, filed May 2008, entitled "STREAMLINED PACKET FORWARDING USING DYNAMIC FILTERS FOR ROUTING AND SECURITY IN A SHARED FORWARDING PLANE," which is incorporated herein by reference.

As shown in FIG. 2, protocols 40 executing within routing engine 32 include one or more MPLS protocols for router-to-router communications. For example, RSVP-TE 45 may generate and maintain a traffic engineering database 49, including bandwidth reservations for paths associated with a network, such as service provider network 20 of FIG. 1. Constrained Shortest Path First (CSPF) process 61 computes a shortest path or paths for a communication session based on specified constraints and bandwidth availability information associated with the links within the network. RP 47 may, in turn, advertise the calculated bandwidth availability information in TED 49 to other peer routers.

Moreover, as shown in FIG. 2, protocols 40 include BFD module 39 that is enhanced in accordance with the techniques described herein. For example, BFD module 39 is configured to dynamically update a session detection time defined by an adjacency timer used to detect a session failure based on one or more congestion conditions detected over the network. Additionally. BFD module 39 of routing engine 32 may program BFD module 39' in forwarding, engine 34 or similar logic not shown) in any of IFCs 50 that utilize BFD protocol-based logic to monitor incoming BFD packets and report a failed connection with another router to routing BFD module 39.

More specifically, BFD module 39' implements BFD protocol-based functionalities, such as transmitting and monitoring for periodic BFD packets, in the data-plane, thereby conserving resources that would otherwise be expended by routing engine 32. In case of a detected connectivity failure. BFD module 39' is configured to transmit a failure notification, or other similar indication, to BFD module 39 of routing engine 32. In response to receiving the failure notification from BFD module 39' of forwarding engine 34, BFD module 39 causes RP 47 to update the network topology currently stored to routing information 36, to reflect the failed link(s) represented by the BFD failure.

As shown in FIG. 2, forwarding engine 34 also includes timer adjustment module 42, which is communicatively coupled to BFD module 39'. While shown separately from BFD module 39' for purposes of clarity, in various examples, timer adjustment module 42 may be included in BFD 39', or may be implemented in other components of router 30. Timer adjustment module 42 is configured to implement one or more of the dynamic congestion-based session detection time adjustment techniques described herein.

In various implementations, timer adjustment module 42 is configured to detect and remediate congestion in a binary fashion, such as by determining whether or not the value of an explicit congestion notification (ECN) field of an incoming BFD packet indicates the presence of congestion. As one example, if the ECN field indicates the presence of network congestion, timer adjustment module 42 sets a session detection time defined by an adjacency timer of BFD module 39' to a high multiple (e.g., five times) a currently negotiated receipt interval at which BFD module 39' would receive periodic BFD packets in a particular BFD session. In this example, if the ECN field, indicates absence of network congestion, timer adjustment module 42 sets the session detection time to a low multiple (e.g., two times) the receipt interval for a particular BFD session. As described with respect to FIG. 2, in response to a failure to receive a BFD packet within expiration of the session detection time, BFD module 39' detects a failure of the link and/or peer router with which the particular BFD session is established.

In other examples, timer adjustment module 42 is configured to detect and remediate congestion in a granular fashion, such as by discerning a congestion level, or a classification thereof, over the link that supports the particular BFD session. In one example, timer adjustment module 42 detects three separate levels of congestion (such as high, mid, and low) from one or more attributes specified within a received BFD packet. In response to the detected congestion level, timer adjustment module 42 adjusts the session detection time in a granular fashion, such as by setting the adjacency timer to one of a high, mid, and low multiple of the receipt interval.

In other examples of granular congestion detection and remediation, timer module 42 is configured to discern a congestion value, or an approximation thereof, from the received BFD packets. Accordingly, timer adjustment module 42 is configured to calculate a corresponding detection multiplier from the congestion value. In these examples, timer adjustment module 42 applies the calculated detection multiplier to the current detection session detection time to generate an updated session detection time.

Instead of, or in addition to, detecting congestion from attributes specified within the received BFD packets, timer adjustment module 42 may detect congestion conditions using one or more timing measurements associated with the BFD packets received as part of a BFD session. An example of such a timing measurement is delay. Delay represents the elapsed time between receipt of two consecutive BFD packets. In a best case scenario of no congestion over the link, the delay for each pair of consecutive BFD packets matches the negotiated receipt interval exactly. In contrast, in cases of network congestion, the delay is greater than the receipt interval. If the congestion-based delay exceeds the session detection time, then BFD module 39' identifies a link failure due to a false alarm. More specifically, the delayed BFD packet will arrive eventually at router 30, indicating that the link remains functional, and that the previously detected failure was a false alarm.

Timer module 42 is configured, in examples, to log statistics indicative of the delay, and use the delay information to generate a detection multiplier for adjusting the session detection time set by an adjacency timer of BFD module 39'. As one example, timer module 42 is configured to calculate a normalized, weighted moving average of the delay across a series of received BFD packets. More specifically, timer module 42 may attach varying weights to the respective delays between different pairs of consecutive BFD packets. Additionally, timer adjustment module 42 calculates an average (such as a mean, median, or mode) of the weighted delays between consecutive BFD packets of the received series of BFD packets.

As described, in an ideal scenario, the normalized weighted moving average would equal the receipt interval negotiated by BFD module 39'. However, under several circumstances, varying levels of congestion may affect data traffic over the network. Under such circumstances, the normalized weighted moving average provides timer adjustment module 42 with a relatively accurate and up-to-date depiction of delays that may occur in receiving BFD packets during a BFD session. Based on the normalized weighted moving average of the delays, timer adjustment module 42 generates a new detection multiplier to apply to the receipt interval, to generate an updated session detection time Examples of calculations that timer adjustment module 42 may use to generate the new detection multiplier based on delay are described in greater detail below.

Another example of a timing measurement that timer adjustment module 42 may use to adjust the session detection time defined by an adjacency timer of BFD module 39' is commonly known as "jitter." Jitter represents a rate of change of delay (e.g., a first derivative of the delay values) over a series of received RFD packets. In examples, timer adjustment module 42 utilizes the jitter to discern tendencies related to congestion over the network. In cases of increasing congestion, timer adjustment module 42 may generate a greater value for the detection multiplier value used to calculate the session detection time. Conversely, in cases of decreasing congestion, timer adjustment module may generate a lower value for the detection multiplier, sometimes even generating a fractional multiplier that, when applied, would reduce the current session detection time.

When using jitter to discern congestion tendencies, timer adjustment module 42 may calculate various values from the jitter values to generate the new detection multiplier value. Examples include an average (such as a normalized weighted moving average) jitter, a standard deviation from the average jitter, and a jitter variance (e.g., the square of the standard deviation value). Calculations that timer adjustment module 42 may perform using jitter and related values are described in greater detail below.

In the various examples described, timer adjustment module 42 may set upper and lower bounds for the newly generated detection multiplier. For instance, timer adjustment module 42 may cap the detection multiplier at ten, meaning that, no matter the congestion level or timing measurement discerned from the received BFD packets, timer adjustment module 42 does not increase the session detection time by any more than a factor of ten. Similarly, timer adjustment module 42 set a lower bound for the detection multiplier e.g., at one, so the session detection time does not dip below the negotiated receipt interval.

While various functionalities are described separately with respect to BFD module 39' and timer adjustment module 42 for purposes of clarity, it will be appreciated that these modules may share or exchange various functionalities described herein. For instance, BFD module 39' may extract congestion-indicating attributes from received BFD packets, and pass the extracted data to tinier adjustment module 42 as calculation parameters. As another example, BFD module 39' may extract the described timing measurements, and pass the measurements to timer adjustment module 42 as calculation parameters. In other examples, BFD module 39' is configured to implement a counter for incoming BFD packets, which may generate other parameters for timer adjustment module 42 to utilize in generating new detection multiplier values.

The architecture of router 30 illustrated in FIG. 2 is shown for exemplary purposes only. In other embodiments, router 30 may be configured in a variety of ways. In one embodiment, for example, control unit 31 and its corresponding functionality may be distributed within IFCs 50. Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as computer memory or hard disk.

Figure 3:
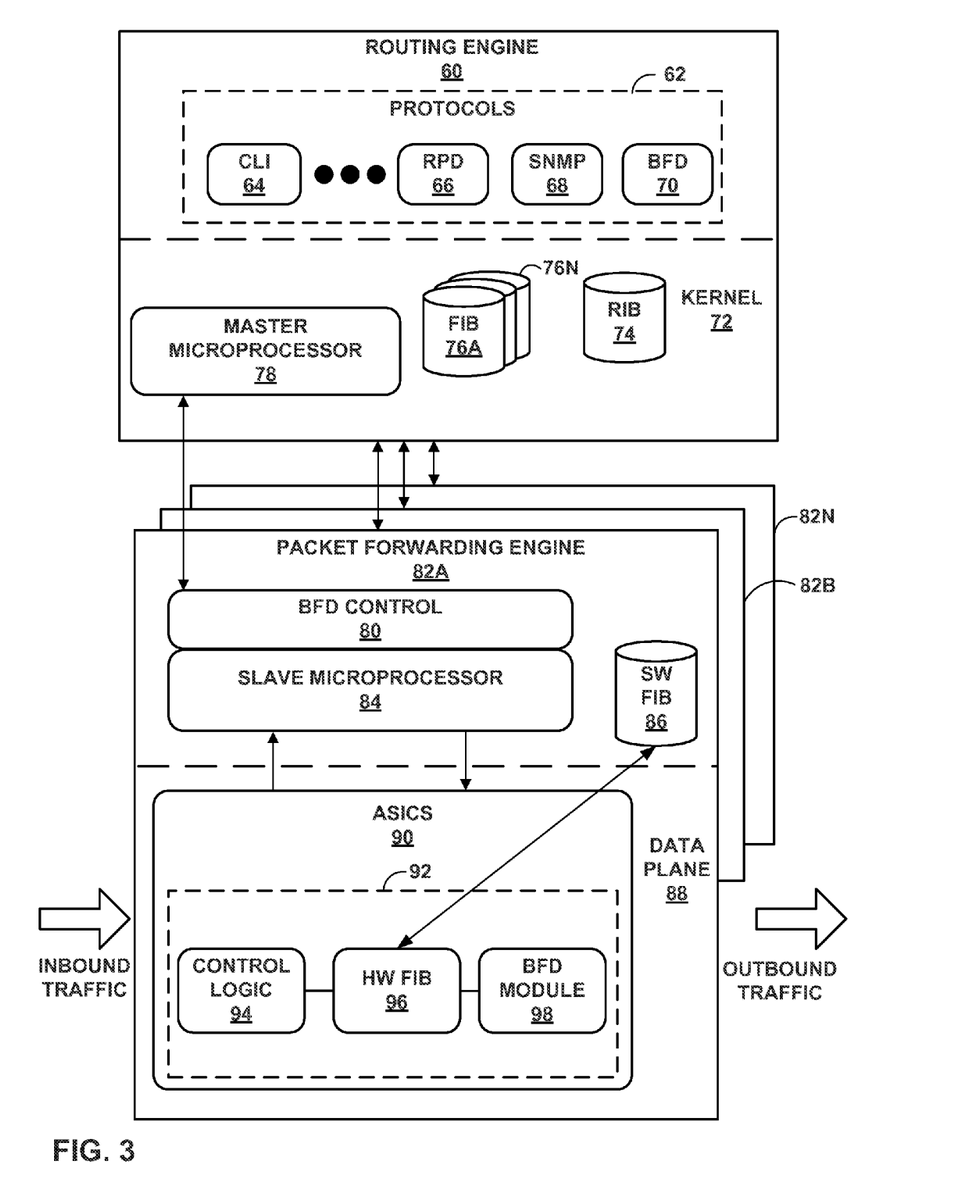
FIG. 3 is a block diagram illustrating further details of a routing engine and a packet forwarding engine of a router, in accordance with one or more aspects of this disclosure.

FIG. 3 is a block diagram illustrating further details of a routing, engine 60 and a packet-forwarding engine 82 of router 30 of FIG. 2 in further detail. Routing engine 60 includes high-level, control plane software processes 62. In this example, software processes include command-line interface daemon 64 ("CLI 64"), routing protocol daemon 66 ("RPD 66"), and Simple Network Management Protocol daemon 68 ("SNMP 68"). In this respect, routing engine 60 may provide routing plane, service plane, and management plane functionality for router 30. Various instances of routing engine 60 may include additional software processes 62 not shown in FIG. 3 that perform other control, management, or service plane functionality and/or drive and otherwise manage data plane functionality for router 30.

RPD 66 interacts with kernel 72 (e.g., by way of API calls) to update routing information base (RIB) 74 based on routing protocol messages received by router 30. RPD 66 may, for example, execute various routing protocols, such as LDP and RSVP of establish LSPs within a network. RIB 74 may include information defining a topology of a network, including one or more routing tables and/or link-state databases. Kernel 43 executes on master microprocessor 78 and may comprise, for example, a UNIX operating system derivative such as Linux or Berkeley Software Distribution (BSD). Kernel 72 processes kernel calls from RPD 66 and generates forwarding information in the form of FIBs 76A-76N based on the network topology represented in RIB 74, i.e., performs route resolution. Typically, RPD 66 generates FIBs 76 in the form of radix or other lookup trees to map packet information (e.g., header information having destination information and/or a label stack) to next hops and ultimately to interface ports of interface cards associated with respective PFEs 82. Master microprocessor 78 of kernel 72 then programs PFEs 82 to install copies of the FIBs as software FIBs 86-48N. Microprocessor 78 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Command line interface daemon 64 ("CLI 64") provides an interface by which an administrator or other management entity may modify the configuration of router 30 using text-based commands. Simple Network Management. Protocol daemon 68 ("SNMP 68") comprises an SNMP agent that receives SNMP commands from a management entity to set and retrieve configuration and management information for router 30. BFD 70 implements BFD protocol-based functionalities in the control-plane of router 30, such as using BFD packet data to update RIB 74 and FIBs 76. Using CLI 64, SNMP 68, and BFD 70, management entities may enable/disable and configure services, install routes, enable/disable and configure rate limiters, and configure interfaces, for example. RPD 66, CLI 64, SNMP 68, and BFD module 70 configure router 30 to implement configured services, add/modify/delete routes, and otherwise modify packet forwarding paths by installing forwarding structures to PFEs 82.

In this example, ASICs 90 are microcode-controlled chipsets programmably configured by a slave microprocessor 84 executing on each of PFEs 82A-82N (e.g., PFE 82A). Specifically, one or more of ASICs 90 is controllable by microcode 92 programmed by slave microprocessor 84. The slave microprocessor 84 programs a hardware FIB 96 into internal memory of ASIC 90 within the data plane 88 based on software FIB 86. When forwarding packets, control logic 94 traverses HW FIB 96 and, upon reaching a FIB entry for the packet (e.g., a leaf node), microcode-implemented control logic 94 automatically selects a forwarding next hop and processes the packets in accordance with the operations defined within the next hop. Additionally, microcode 92 includes BFD module 98, which implements various functionalities in accordance the BFD protocol. As examples, BFD module 98 implements one or more of the adjacency timer, the expiration of which triggers a failure detection of link to another router, and a BFD counter, which maintains a count of BFD packets received as part of a BFD session.

In accordance with the techniques described herein, slave microprocessor 84 implements BFD control 80. BFD control 80, in turn, implements one or more of the dynamic adjacency timer adjustment algorithms described herein. More specifically, microcode-implemented BFD module 98 is configured to communicate information relevant to received BFD packets to BFD control 80. Examples of such information include the value of ECN bits (e.g., bits of the respective ECN fields) of the BFD packets, congestion levels indicated by one or more attributes specified within the BFD packets, and timing data and/or measurements associated with the received BFD packets. Specific implementations are described in greater detail with reference to FIGS. 4 and 5A-5C below.

Figure 4:
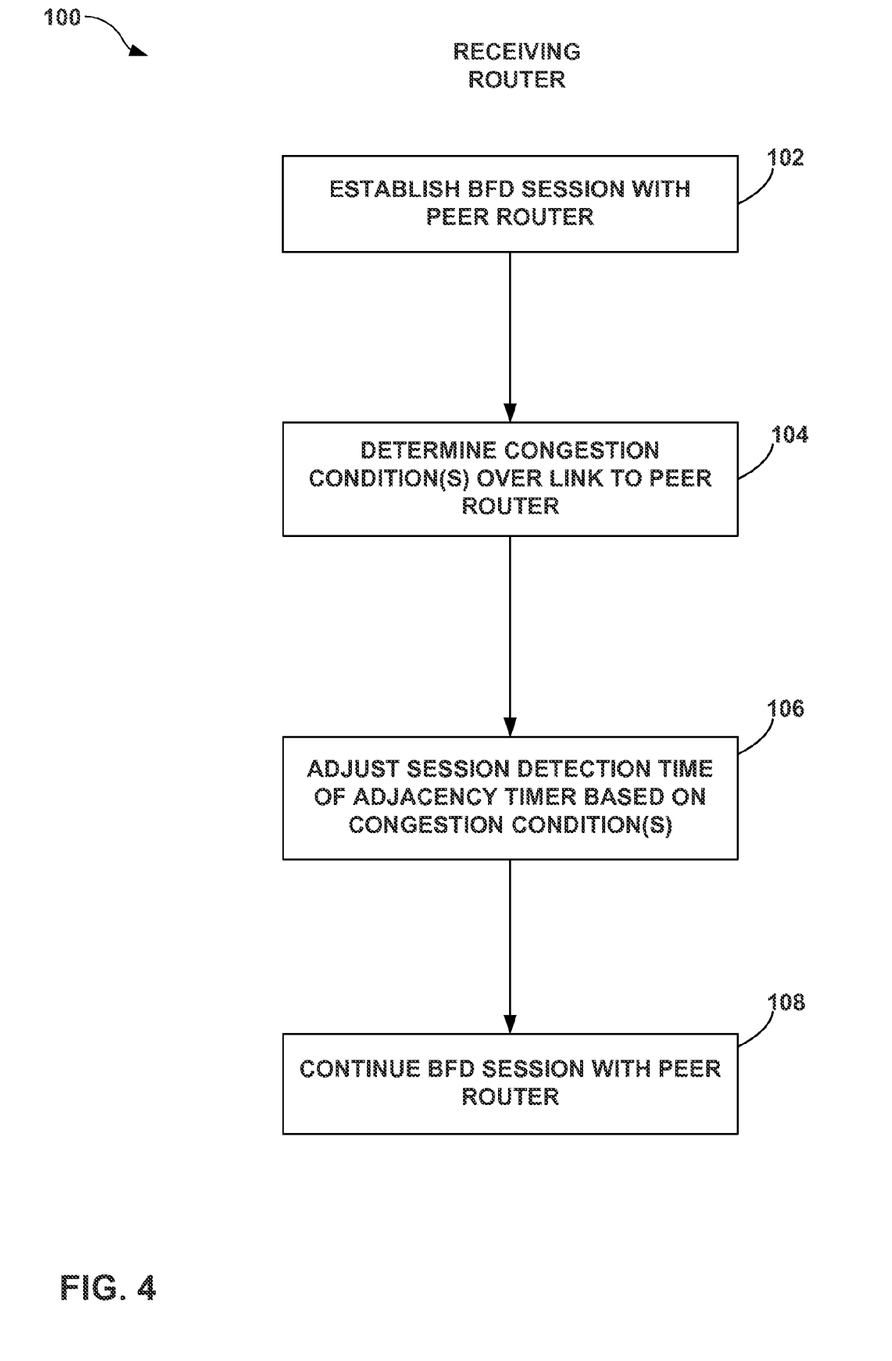
FIG. 4 is a flowchart illustrating an example process by which a router participates in a communicative session with a client device, in accordance with one or more aspects of this disclosure.

FIG. 4 is a flowchart illustrating an example process 100 by which a router participates in a communicative session with a client device, in accordance with one or more aspects of this disclosure. While process 100 may be implemented by any of a variety of network devices, for purposes of clarity only, process 100 is described herein with reference to router 30 of FIG. 2, and its various components.

Process 100 begins when router 30 establishes a BFD session with a second router (102). For instance, router 30 may establish the BFD session such that forwarding engine 34 sends and receives periodic communications, and communicates pertinent information, such as failures of link(s) and/or peer router(s), to rowing engine 32. To detect and remediate communication issues due to failures, routing engine 32 and forwarding engine 34 implement BFD modules 39 and 39', respectively.

Timer adjustment module 42 detects one or more congestion conditions over the link to the second router (104). In various examples, timer adjustment module 42 detects the congestion condition using attributes specified within the received BFD packets, or using timing data and measurements associated with the received BFD packets. Examples of attributes include the ECN field of the IP header, and congestion levels indicated within control-plane and/or data-plane information of the received BFD packets. Examples of timing measurements include delay and jitter, described above.

Based on the detected congestion condition(s), timer adjustment module 42 adjusts the session detection time defined by the adjacency timer executed by BFD module 39' (106). More specifically, timer adjustment module 42 may increase the session detection time in cases of heavier congestion (e.g., by generating and applying a greater detection multiplier to the receipt interval), and may reduce the session detection time in cases of lighter or no congestion (e.g., by generating and applying a lesser detection multiplier to the receipt interval). By adjusting the session detection time in this manner, timer adjustment module 42 may mitigate false alarms caused by congestion-based delays, and also mitigate packet loss caused by late detection of legitimate failures.

After timer adjustment module 42 adjusts the session detection time defined by the adjacency timer, BFD module 39' may continue the current BFD session with the second router (108). More specifically, timer adjustment module adjusts the session detection time during a BFD session, thereby providing dynamic adjacency timer adjustment of the receipt interval for periodic communications. In this manner, the techniques of this disclosure provide a way for a router to adjust a session detection time defined by an adjacency timer without terminating a current BFD session and establishing a new session with updated BFD timer parameters.

Figure 5A:
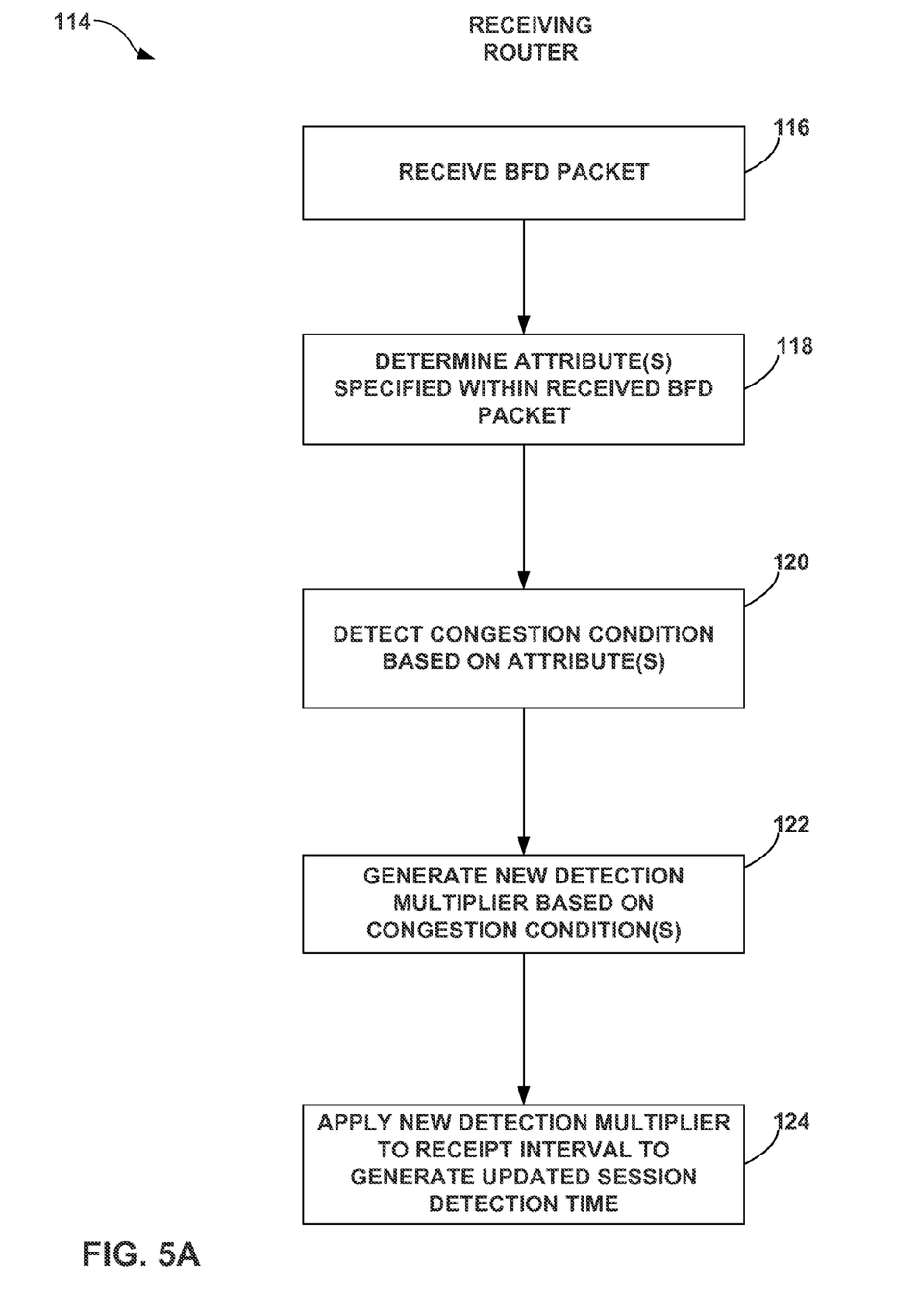
FIGS. 5A-5C are flowcharts illustrating example processes by which a router updates a session detection time based on congestion condition(s), in accordance with one or more aspects of this disclosure.
Figure 5B:
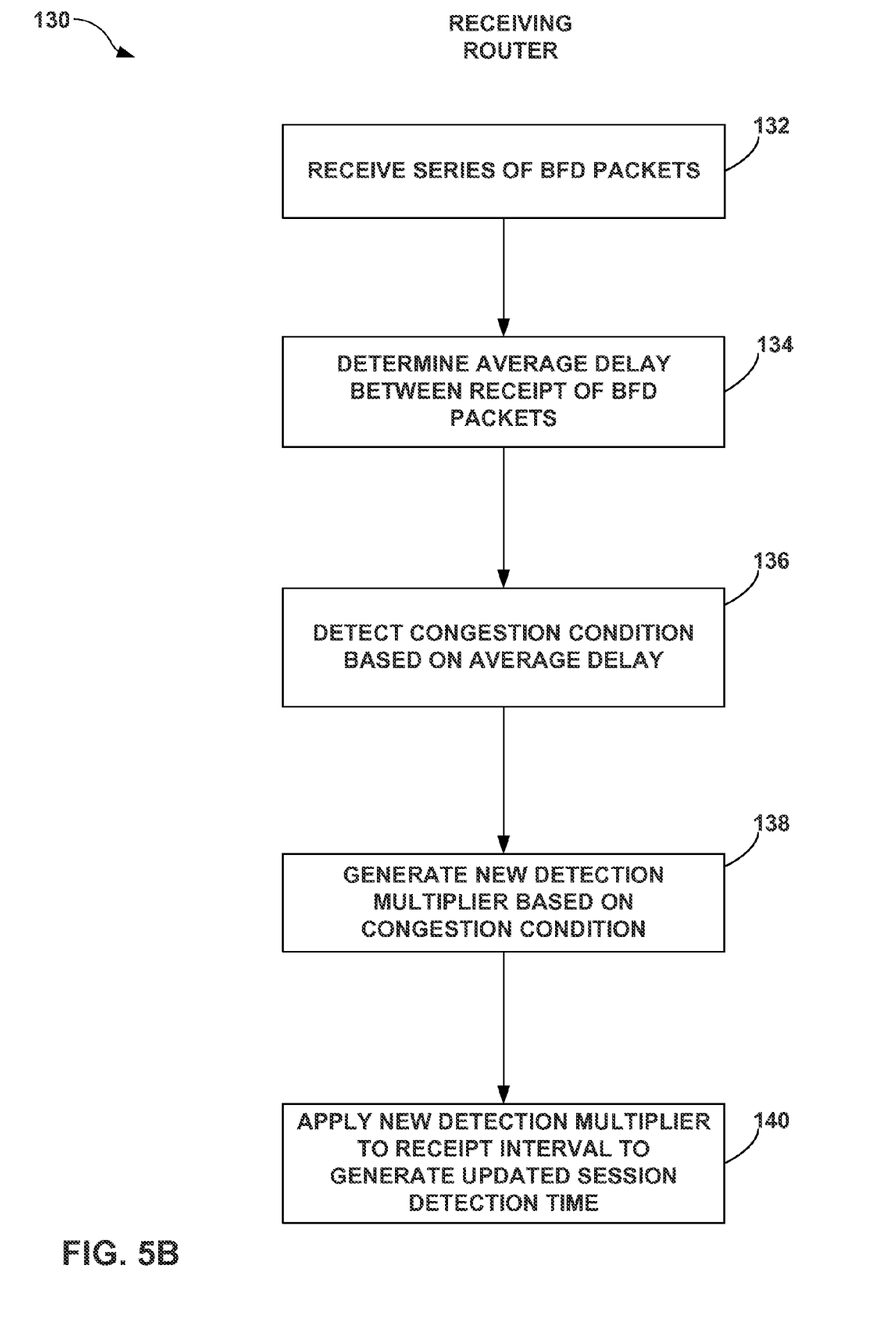
Figure 5C:
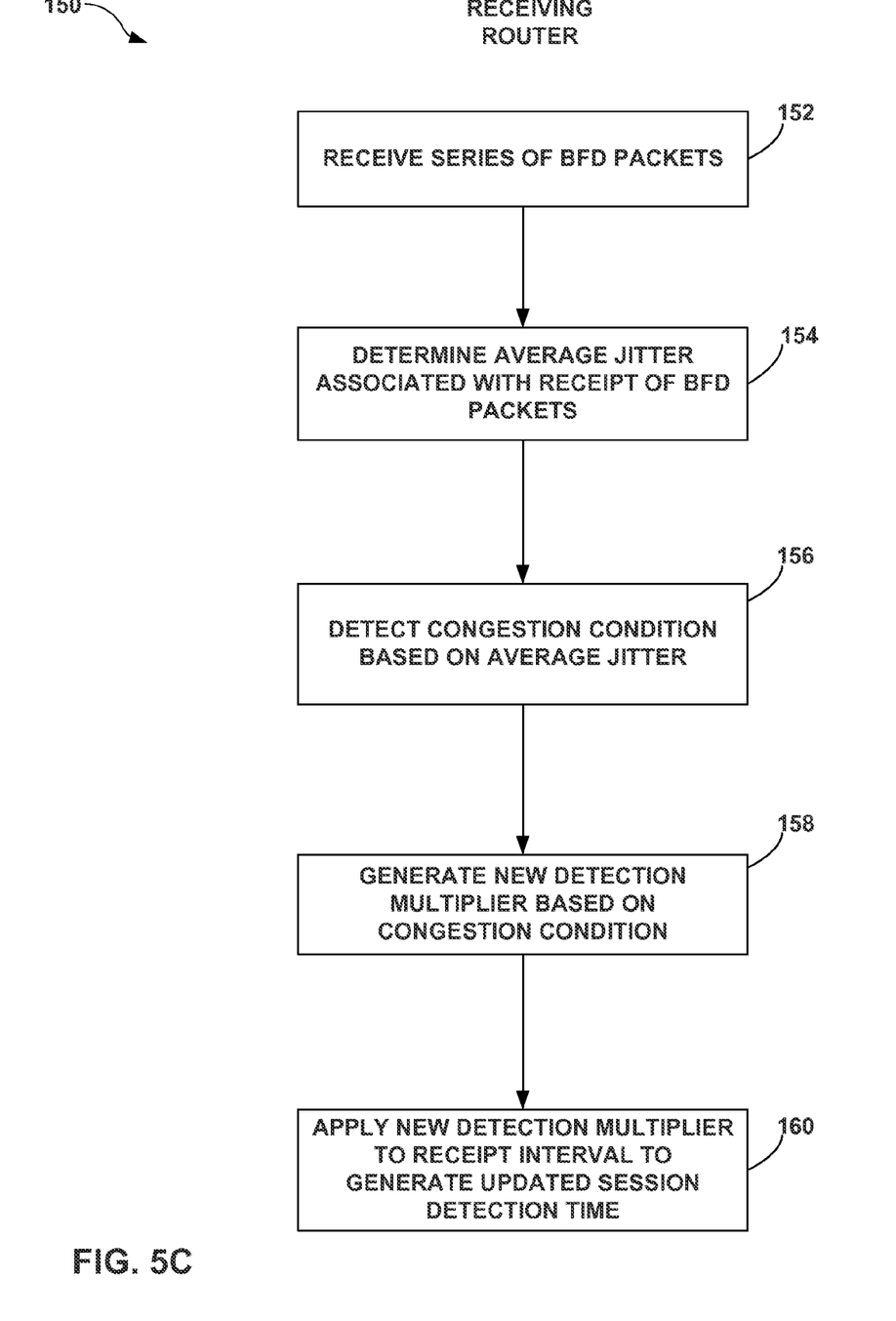

FIGS. 5A-5C are flowcharts illustrating example processes by which a router updates a session detection time based on congestion condition(s), in accordance with one or more aspects of this disclosure. Similarly to FIG. 4, for purposes of clarity only, respective processes 114, 130, and 150 of FIGS. 5A-5C are described herein with reference to the various muter components illustrated, in FIG. 3.

FIG. 5A illustrates an example process 114 by which a receiving router implements the dynamic session detection time adjustment techniques of this disclosure using, one or more attributes specified within a received periodic communication. Process 114 begins when microcode-implemented BFD module 98 receives a periodic network communication, such as a BFD packet (116). As described, BFD module 98 is configured to receive the BFD as a periodic communication over a specific BFD session established with a peer router.

Additionally, microcode-implemented BFD module 98 determines one or more attributes specified within the received BFD packet (118). Examples of attributes specified within the received BFD packet may include the ECN field of an IP packet that encapsulates the user datagram protocol (UDP)-based BFD packet, control bits in the BFD packet header such as diagnostic bits, or both. The attributes determined from the BFD packet may include data pertaining to congestion over the network, such as granular congestion data. More specifically, the granular congestion data may indicate levels of congestion, such as high-, mid-, and low-levels of congestion, or a specific value to denote the severity of the congestion. In turn, microcode-implemented BFD module 98 forwards the congestion information, such as the value indicated by the ECN field and/or the granular congestion information, to BFD control 80.

BFD control 80 is configured to detect a congestion condition based on the attribute(s) received from BFD module 98 (120). In examples where BFD control 80 receives only a binary value indicated by the ECN field of the IP header of a received packet, BFD control 80 detects only whether or not congestion exists over the network, but does not detect any more information pertaining to the congestion. Conversely, in examples where BFD control 80 receives more specific congestion based data, such as graduated levels and/or specific congestion values, BFD control 80 may detect the congestion condition in a granular fashion.

Based on the detected congestion condition, BFD control 80 is configured to generate a new detection multiplier (122). For instance, in the binary implementation described above, BFD control 80 may set the new detection multiplier to either a high multiple (in the case of the ECN field of the IP header indicating congestion), or a low multiple (in cases where the ECN field of the IP header indicates absence of congestion). In contrast, in the granular implementations described above, BFD control. 80 may set the new detection multiplier to one of a three or more values, such as by selecting it detection multiplier value based on congestion level, or by generating a specific detection multiplier value based on a received congestion value. BFD control 80 applies the new detection multiplier to the negotiated receipt interval to adjust the session detection time defined by the adjacency timer of microcode-implemented BFD module 98 (140). In turn, microcode-implemented BFD module 98 applies the adjusted session detection time to detect BFD failures (124).

FIG. 5B illustrates an example process 130 by which a receiving router implements the dynamic session detection time adjustment techniques of this disclosure using delay information between consecutively received packets in a BRD session. Process 130 begins when microcode-implemented BFD module 98 receives a series of BFD packets in a BFD session (132). In one example, microcode-implemented BFD module 98 sends timestamps associated with received BFD packets to BFD control 80. Using the timestamps, BFD control 80 is configured to determine an average delay between receipt of the BFD packets (134). More specifically, BFD control 80 determines a series of delays, with each delay of the series being associated with two consecutive received BFD packets. For instance, BFD control 80 may implement the following formula; $d_i=(t_{i+1}-t_i)$, where $d_i$ represents the delay corresponding to the $i^{th}$ BFD packet, $t_{i+1}$ represents the receipt time of the $(i+1)^{th}$ BFD packet, and $t_i$ represents the receipt time of the $i^{th}$ BFD packet. Based on the determined delay for each BFD packet of the series, BFD control 80 may calculate a weighted moving average of the delays, the weighted moving average function is denoted by f(i).

Additionally, BFD control 80 imposes the following restrictions on the weighted moving average function. First, f(i) produces a result of zero in all cases where microcode-implemented BFD module 98 recognizes i to have a negative value. Second, the sum of all results of f(i) within the series (or within a window of the series selected by BFD control 80) equals one. These two conditions may be expressed as follows:

$$f_i = 0 \forall i < 0, \text{ and}$$

$$\Sigma_{i=0}^{N-1} f_i = 1,$$

where N is the window length in terms of number of packets. Examples of weighted moving average functions that BFD control 80 may implement are:

$$f_i = 0 \forall i < 0; f_i = \left(\frac{e-1}{e}\right) e^{-i} \forall i \geq 0$$

(a normalized infinite window function), and $$f_i = 0 \forall i < 0; f_i = \frac{1}{N} \text{ for } 0 \leq i < N; f_i = 0 \forall i \geq N$$

(an example of a normalized flat window function).
Using the weighted moving average of the delays, BFD control 80 detects a congestion condition (136).

Based on the congestion condition, and the results of the weighted moving average functions, BFD control 80 generates a new detection multiplier (138). More specifically, BFD control 80 is configured to generate the new detection multiplier for the $(i+1)^{th}$ BFD packet using the following formula:

$$m_{i+1} = \frac{\alpha \left( \sum_{k=(N-1)}^{k=0} f_k d_{(i-k)} \right)}{D},$$

where D is the negotiated receipt interval for inbound BFD packets, and α is a constant defined by BFD control 80. BFD control 80 applies the new detection multiplier ($m_{i+1}$) to the negotiated receipt interval to adjust the session detection time defined by the adjacency timer of microcode-implemented BFD module 98 (140). In turn, microcode-implemented BFD module 98 applies the adjusted session detection time to detect BFD failures beginning with the $(i+2)^{th}$ BFD packet.

FIG. 5C illustrates an example process 150 by which a receiving router implements the dynamic session detection time adjustment techniques of this disclosure using the rate of change of delay, known as jitter, across the series of BFD packets, to generate the new detection multiplier. Process 150 may begin when microcode-implemented BFD module 98 receives a series of BED packets in a BFD session (152). Microcode-implemented BFD module 98 may forward timestamps associated with the BFD packets, or delay calculations determined from the timestamps, to BFD control 80. In turn, BFD control 80 determines an average jitter associated with receipt of the BFD packets (154).

BFD control 80 is configured to calculate jitter using the following formula:

$$\delta_i = (d_{i+1} - d_i),$$

where $\delta_i$ represents the jitter associated with the $i^{th}$ BFD packet. After microcode-implemented BFD module 98 receives the $(i+2)^{th}$ BFD packet of the series, BFD control 80 applies the following formula:

$$\mu_{di} = \Sigma_{k=(N-1)}^{k=0} f_k d_{(i-k)},$$

where $\mu_{di}$ represents the weighted moving average delay across the series. Similarly, BFD control 80 derives the average jitter, represented by $\mu_{\delta i}$, using the following formula:

$$\mu_{\delta i} = \Sigma_{k=(N-1)}^{k=0} f_k \delta_{(i-k)}.$$

Additionally, BFD control 80 may extract deviation-related data of the jitter, such as the variance of the jitter, for use in determining the detection multiplier. For instance, BFD control 80 calculates the variance of the jitter using the formula:

$$\sigma_{\delta i} = \sqrt{\frac{1}{N} \sum_{k=i-N+1}^{k=i} (\delta_k - \mu_{\delta k})^2}.$$

Based on the average jitter and/or values derived from the average jitter, BFD control 80 determines a congestion condition (156).

Based on the congestion condition, and using the jitter and related values, BFD control 80 may generate a new detection multiplier (158). In examples, BFD control 80 applies the following formula to generate the new detection multiplier:

$$m_{i+2} = \frac{1}{D} \{\alpha \mu_{d(i+1)} + (\mu_{\delta i} + \beta \sigma_{\delta i})\},$$

where $\alpha$ and $\beta$ are constants defined by BFD control 80. As jitter represents the rate of change of delay, BFD control uses three packets, namely, the $i^{th}$, $(i+1)^{th}$ $(i+2)^{th}$ packets to derive the jitter. In turn, BFD control 80 applies the new detection multiplier $M_{i+2}$ to the receipt interval defined by the adjacency timer of microcode-implemented BFD module 98 to derive a new session detection time after receipt of the $(i+3)^{th}$ BFD packet (160).

As described above with respect to FIG. 3, RFD control 80, in some examples, sets an upper bound and/or a lower bound for the detection multipliers generated using the listed algorithms. In examples, the bounds may represent integer values or floating point values, such as a fractional value. Additionally, BFD control 80 is configured to communicate various BFD session information to master microprocessor 78 of routing engine 60. Using the BFD session information, master microprocessor 78 may utilize RPD 66 and kernel 72 to update RIB 74 and FIBs 76 to reflect any updated network topology information.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described, herein. If implemented in software, the techniques may be realized at least in part by a non-transitory computer-readable storage medium or computer-readable storage device encoded with, having, stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:
   receiving, by a network device, bidirectional forwarding detection (BFD) packets for a BFD session for monitoring connectivity with a peer network device;
   determining, by the network device, a weighted moving average in which more recent timing measurements of a series of timing measurements are weighted with greater weights, respectively, relative to earlier timing measurements of the series of timing measurement, the series of timing measurements based on respective receipt times of the BFD packets;
   adjusting, by the network device and based on the weighted moving average, a detection multiplier that specifies a multiple of a negotiated transmission time interval for the BFD session to define, at least in part, a session detection time for the BFD session; and
   detecting, by the network device and based at least on a failure to receive a subsequent BFD packet for the BFD session within the session detection time for the BFD session, a failure of connectivity with the peer network device.

2. The method of claim 1,
   wherein the BFD session is associated with a configured detection multiplier and the detection multiplier, and
   wherein adjusting the detection multiplier comprises determining the detection multiplier for the BFD session as a product of the configured detection multiplier and the weighted moving average.

3. The method of claim 1, wherein the detection multiplier is a non-integer value.

4. The method of claim 1,
wherein the BFD session is associated with a configured detection multiplier and the detection multiplier, and
wherein adjusting the detection multiplier comprises:
determining a computed detection multiplier as a product of the configured detection multiplier and the weighted moving average;
setting the detection multiplier for the BFD session to an upper bound if the computed detection multiplier is greater than the upper bound; and
setting the detection multiplier for the BFD session to a lower bound if the computed detection multiplier is less than a lower bound.

5. The method of claim 1,
wherein the series of timing measurements comprises a series of delays associated with respective receipt times for consecutive BFD packets of the BFD packets, and
wherein determining the weighted moving average of the series of timing measurements comprises determining a weighted moving average of the series of delays.

6. The method of claim 1, further comprising:
applying the detection multiplier to a receipt interval to calculate the session detection time; and
setting a timer to expire at the session detection time.

7. The method of claim 1,
wherein the series of timing measurements comprises series of jitters associated with respective receipt times for consecutive BFD packets of the BFD packets, and
wherein determining the weighted moving average of the series of timing measurements comprises determining a weighted moving average of the series of jitters.

8. A network device comprising:
a memory;
and
a control unit having one or more programmable processors and configured to:
execute a timer;
receive bidirectional forwarding detection (BFD) packets for a BFD session for monitoring connectivity with a peer network device;
determine a weighted moving average in which more recent timing measurements of a series of timing measurements are weighted with greater weights, respectively, relative to earlier timing measurements of the series of timing measurement, the series of timing measurements based on respective receipt times of the BFD packets;
adjust, based on the weighted moving average, a detection multiplier that specifies a multiple of a negotiated transmission time interval for the BFD session to define, at least in part, a session detection time for the BFD session; and
detect, based at least on a failure to receive a subsequent BFD packet for the BFD session within the session detection time for the BFD session, a failure of connectivity with the peer network device.

9. The network device of claim 8,
wherein the BFD session is associated with a configured detection multiplier and the detection multiplier, and
wherein to adjust the detection multiplier the control unit is further configured to determine the detection multiplier for the BFD session as a product of the configured detection multiplier and the weighted moving average.

10. The network device of claim 8, wherein the detection multiplier is a non-integer value.

11. The network device of claim 8,
wherein the BFD session is associated with a configured detection multiplier and the detection multiplier, and
wherein to adjust the session multiplier the control unit is further configured to:
determine a computed detection multiplier as a product of the configured detection multiplier and the weighted moving average;
set the detection multiplier for the BFD session to an upper bound if the computed detection multiplier is greater than the upper bound; and
set the detection multiplier for the BFD session to a lower bound if the computed detection multiplier is less than a lower bound.

12. The network device of claim 8,
wherein the series of timing measurements comprises a series of delays associated with respective receipt times for consecutive BFD packets of the BFD packets, and
wherein, to determine the weighted moving average of the series of timing measurements, the control unit is further configured to determine a weighted moving average of the series of delays.

13. The network device of claim 8, wherein the control unit is configured to:
apply the detection multiplier to a receipt interval to calculate the session detection time; and
set a timer to expire at the session detection time.

14. The network device of claim 8, wherein
the series of timing measurements comprises a series of jitters associated with respective receipt times for consecutive BFD packets of the BFD packets, and
wherein, to determine the weighted moving average of the series of timing measurements, the control unit is further configured to determine a weighted moving average of the series of jitters.

15. A non-transitory computer-readable storage medium encoded with instructions that, when executed, cause one or more programmable processors of a network device to:
receive bidirectional forwarding detection (BFD) packets for a BFD session for monitoring connectivity with a peer network device;
determine a weighted moving average in which more recent timing measurements of a series of timing measurements are weighted with greater weights, respectively, relative to earlier timing measurements of the series of timing measurement, the series of timing measurements based on respective receipt times of the BFD packets;
adjust, based on the weighted moving average, a detection multiplier that specifies a multiple of a negotiated transmission time interval for the BFD session to define, at least in part, a session detection time for the BFD session; and
detect, based at least on a failure to receive a subsequent BFD packet for the BFD session within the session detection time for the BFD session, a failure of connectivity with the peer network device.

* * * * *